United States Patent
Kowsky et al.

(10) Patent No.: US 9,879,891 B2
(45) Date of Patent: Jan. 30, 2018

(54) UNITARY HEAT PUMP AIR CONDITIONER HAVING A COMPRESSED VAPOR DIVERSION LOOP

(71) Applicant: MAHLE International GmbH, Stuttgart (DE)

(72) Inventors: Carrie M Kowsky, Lockport, NY (US); Prasad S. Kadle, Williamsville, NY (US); Frederick V. Oddi, Orchard Park, NY (US); Lindsey L. Leitzel, Lockport, NY (US)

(73) Assignee: MAHLE International GmbH, Stuttgart (DE)

( * ) Notice: Subject to any disclaimer, the term of this patent is extended or adjusted under 35 U.S.C. 154(b) by 172 days.

(21) Appl. No.: 14/203,903

(22) Filed: Mar. 11, 2014

(65) Prior Publication Data

US 2014/0190189 A1 Jul. 10, 2014

Related U.S. Application Data

(63) Continuation-in-part of application No. PCT/US2012/025419, filed on Feb. 16, 2012, and a
(Continued)

(51) Int. Cl.
*F25B 41/00* (2006.01)
*F25B 30/02* (2006.01)
(Continued)

(52) U.S. Cl.
CPC ......... *F25B 30/02* (2013.01); *B60H 1/00342* (2013.01); *B60H 1/00899* (2013.01);
(Continued)

(58) Field of Classification Search
CPC ...... F25D 21/12; F25B 47/022; F25B 25/005; F25B 2400/0411; B60H 1/00342; B60H 1/00899; B60H 2001/00928; F28D 9/0093
See application file for complete search history.

(56) References Cited

U.S. PATENT DOCUMENTS

| 5,291,941 A | 3/1994 | Enomoto et al. |
| 6,883,334 B1 * | 4/2005 | Shah ....................... F25B 41/04 62/156 |

(Continued)

OTHER PUBLICATIONS

International Search Report dated May 12, 2014.

*Primary Examiner* — Len Tran
*Assistant Examiner* — Ana Vazquez
(74) *Attorney, Agent, or Firm* — Brinks Gilson & Lione

(57) ABSTRACT

Disclosed is a unitary heat pump air conditioner (HPAC) system having a refrigerant diversion loop configured to supply sufficient heat to defrost an external heat exchanger while not materially affecting the supply of heat to the passenger compartment of a vehicle. The HPAC system includes a refrigerant loop configured to pump heat from a cold coolant loop that scavenges heat from the external heat exchanger to a hot coolant loop that supplies heat to the passenger compartment. The refrigerant loop includes a condenser in thermal communication with the hot coolant loop, evaporator in thermal communication with the cold coolant loop, and a compressor to cycle the refrigerant through the refrigerant loop. The refrigerant loop further includes means to selectively divert at least a portion of the hot compressed refrigerant exiting the compressor directly to the evaporator to heat the cold coolant loop sufficient to defrost the external heat exchanger.

14 Claims, 7 Drawing Sheets

Related U.S. Application Data continuation-in-part of application No. 13/396,211, filed on Feb. 14, 2012, now Pat. No. 8,899,062.

(60) Provisional application No. 61/777,677, filed on Mar. 12, 2013, provisional application No. 61/443,774, filed on Feb. 17, 2011.

(51) Int. Cl.
*B60H 1/00* (2006.01)
*F28D 9/00* (2006.01)
*F25B 25/00* (2006.01)
*F25B 47/02* (2006.01)
*F25D 21/12* (2006.01)

(52) U.S. Cl.
CPC .......... *F25B 25/005* (2013.01); *F25B 47/022* (2013.01); *F25D 21/12* (2013.01); *F28D 9/005* (2013.01); *F28D 9/0093* (2013.01); *B60H 2001/00928* (2013.01); *F25B 2339/047* (2013.01); *F25B 2400/0403* (2013.01); *F25B 2400/0411* (2013.01)

(56) References Cited

U.S. PATENT DOCUMENTS

| | | | |
|---|---|---|---|
| 7,762,090 B2 | 7/2010 | Lee | |
| 8,516,841 B2 | 8/2013 | Wittmann et al. | |
| 2004/0050086 A1* | 3/2004 | Amaral | B60H 1/00907 62/244 |
| 2006/0107671 A1* | 5/2006 | Yoshida | F25B 41/043 62/151 |
| 2007/0137228 A1* | 6/2007 | Li | F25B 47/022 62/196.4 |
| 2010/0281901 A1 | 11/2010 | Kawase et al. | |
| 2011/0185760 A1* | 8/2011 | Suh | F25B 5/00 62/344 |
| 2011/0271703 A1* | 11/2011 | Park | F25B 5/02 62/291 |

* cited by examiner

UNITARY HEAT PUMP AIR CONDITIONER HAVING A COMPRESSED VAPOR DIVERSION LOOP

CROSS-REFERENCE TO RELATED APPLICATION

This application claims the benefit of U.S. Provisional Patent Application No. 61/777,677, filed 12 Mar. 2013, which is hereby incorporated by reference in its entirety.

This application is also continuation-in-part of International Application No. PCT/US2012/025419, filed on 16 Feb. 2012, which claims the benefit of U.S. Provisional Patent Application No. 61/443,774, filed 17 Feb. 2011.

This application is also a continuation-in-part of U.S. patent application Ser. No. 13/396,211, filed on 14 Feb. 2012, which claims the benefit of United States Provisional Patent Application No. 61/443,774, filed 17 Feb. 2011.

Each of International Application No. PCT/US2012/025419, U.S. patent application Ser. No. 13/396,211, and U.S. Provisional Patent Application No. 61/443,774 is hereby incorporated by reference in its entirety.

TECHNICAL FIELD OF INVENTION

The present disclosure relates to a heating and air-conditioning system for an automotive vehicle; particularly, to a heat pump air-conditioning system.

BACKGROUND OF INVENTION

A typical motor vehicle air-conditioning system includes an evaporator located in the HVAC module adjacent to the passenger compartment and a condenser located in the front engine compartment exposed to outside ambient air. A compressor circulates a two-phase refrigerant through the evaporator where it expands into a low pressure vapor refrigerant by absorbing heat from the passenger compartment, thereby providing cooled air to the occupants. The low pressure vapor is compressed to a high pressure vapor by a compressor and then conveyed to the condenser where the high pressure vapor is condensed into a high pressure liquid refrigerant by releasing the heat to the ambient air. The liquid phase is returned to the evaporator through an expansion device which converts the high pressure liquid refrigerant to a low pressure mixture of liquid and vapor refrigerant to continue the cycle.

For vehicles having smaller internal combustion engines and for electric vehicles, it is known to operate the air-conditioning system in heat pump mode by reversing the refrigerant flow to provide supplementary heat to the passenger compartment. When the refrigerant flow is reversed, the condenser absorbs heat from the outside ambient air by evaporating the liquid phase refrigerant and the evaporator releases the heat to the passenger compartment by condensing the vapor phase refrigerant.

One disadvantage to operating the air-conditioning system in heat pump mode, since the low pressure side of the system when used in air conditioning mode would become the high pressure side when used in heat pump mode, is the increase in system complexity due to the requirement of having to reinforce the refrigerant plumbing throughout the system by using thicker gage tubing and fittings. Another known disadvantage of operating the system in heat pump mode is that in cooler climates, as the surface temperature of the condenser drop below 32° F., any moisture condensed on the surface of the condenser is subject to freezing, therefore resulting in reduced efficiency of the system and even potentially damaging the condenser.

Based on the foregoing, there is need for a heating system that provides supplementary heat to the passenger compartment of a motor vehicle that does not require reversing the refrigerant cycle of the air-conditioning system or detrimentally impacting the electric driving range.

SUMMARY OF THE INVENTION

The present disclosure relates to a Unitary Heat Pump Air Conditioner (Unitary HPAC) system having a refrigerant diversion loop configured to supply sufficient heat to defrost an external heat exchanger while not materially affecting the supply of heat to the passenger compartment of a vehicle. The HPAC system includes a refrigerant loop configured to pump heat from a cold coolant loop that scavenges heat from the external heat exchanger to a hot coolant loop that supplies heat to the passenger compartment. The refrigerant loop includes a condenser in thermal communication with the hot coolant loop, an evaporator in thermal communication with the cold coolant loop, and a compressor to cycle the refrigerant through the refrigerant loop. The refrigerant loop further includes means to selectively divert at least a portion of the hot compressed refrigerant exiting the compressor directly to the evaporator to heat the cold coolant loop sufficient to defrost the external heat exchanger.

The present disclosure further relates also relates to a method for defrosting an external heat exchanger of a HPAC system, including the steps of providing a refrigerant loop having a condenser configured to condense a hot compressed refrigerant into a liquid refrigerant, an expansion device configured to receive and partially expand the hot liquid refrigerant from the condenser into a vapor-liquid phase refrigerant, an evaporator downstream of the expansion device configured to evaporate the vapor-liquid phase refrigerant into a cold vapor refrigerant, and a compressor configured to receive and compress the cold vapor refrigerant from the evaporator into the hot compressed refrigerant for the condenser; providing a cold coolant loop in thermal communication with the evaporator and the external heat exchanger; and diverting at least a portion of the hot compressed refrigerant exiting from the compressor to the evaporator to transfer sufficient heat from the hot compressed refrigerant to the cold coolant loop to defrost the external heat exchanger.

The HPAC and method provides the advantages of being able to defrost the external heat exchanger without noticably affecting the heat supplied to the passenger compartment of a HPAC system. By diverting all or a portion of the hot refrigerant to heat the cold coolant loop and not diverting the hot coolant loop avoids materially affecting passenger comfort, since the compressed vapor diversion loop is independent of the hot coolant flow through the comfort heat exchanger.

Further features and advantages of the invention will appear more clearly on a reading of the following detailed description of an embodiment of the invention, which is given by way of non-limiting example only and with reference to the accompanying drawings.

DETAILED DESCRIPTION OF DRAWINGS

This invention will be further described with reference to the accompanying drawings in which.

DETAILED DESCRIPTION OF INVENTION

Figure 1:
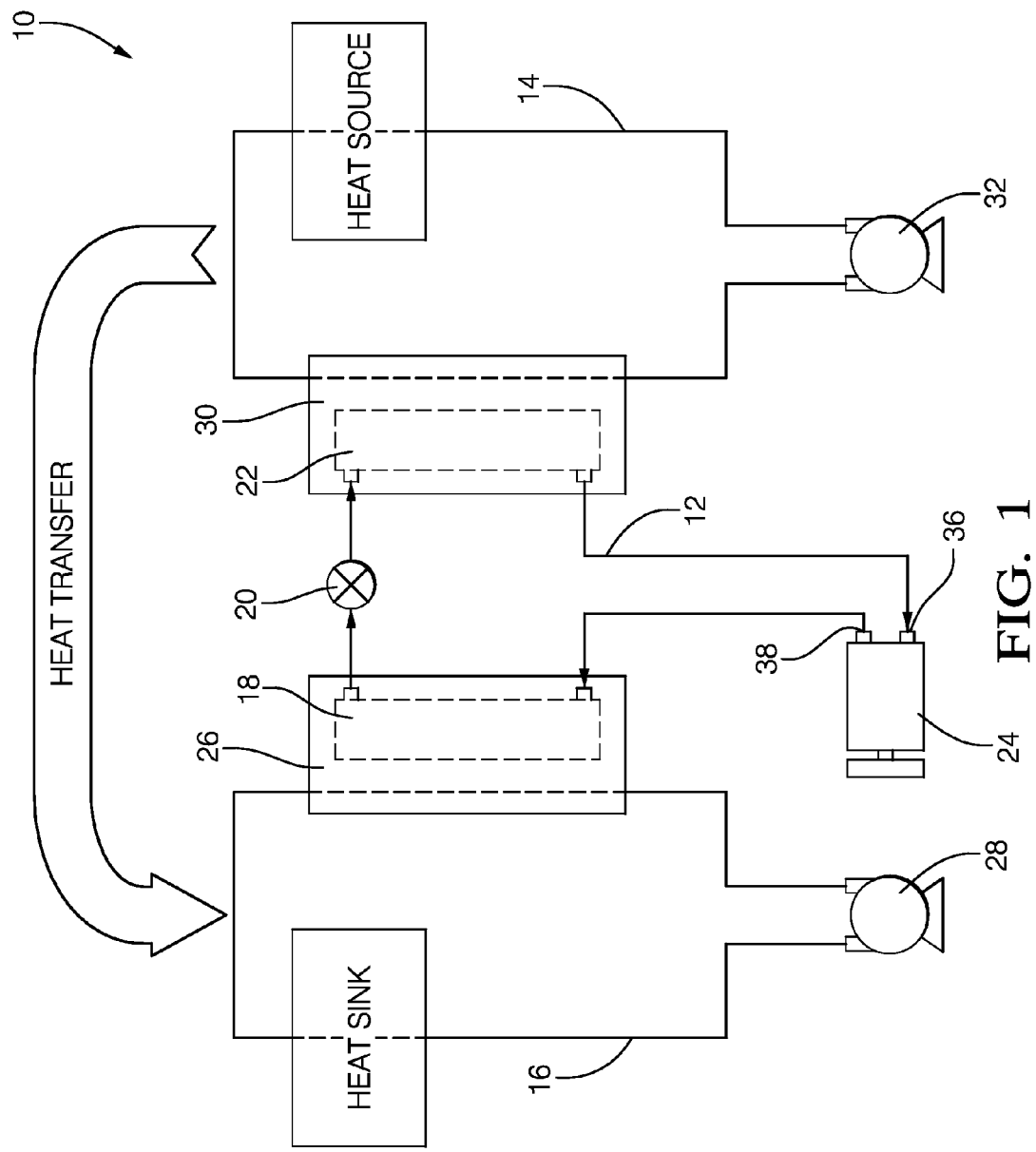
FIG. 1 shows a schematic of diagram of a Unitary Heat Pump Air Conditioner (Unitary HPAC) System.

Shown in FIG. 1 is flow schematic of a Unitary HPAC System 10 configured to captures waste heat energy from one part of a motor vehicle and puts it to beneficial use within another part of the vehicle. The Unitary HPAC System 10 includes a refrigerant loop 12 in thermal communication with a cold coolant loop 14 and a hot coolant loop 16. The main components of the refrigerant loop 12 include a condenser 18, a refrigerant expansion device 20, and an evaporator 22 hydraulically connected in series in a closed circuit. At the heart of the refrigerant loop is a refrigerant compressor 24 located downstream of the evaporator 22 and upstream of the condenser 18 with respect to the direction of refrigerant flow. The compressor 24 is responsible for compressing and cycling a two-phase refrigerant, such as R-134a or R-1234yf, through the refrigerant loop 12 of the Unitary HPAC System 10.

The hot coolant loop 16 includes a hot heat exchanger 26 in thermal communication with the condenser 18 and a hot coolant pump 28 that circulates a hot coolant through the hot heat exchanger 26. Similarly, the cold coolant loop 14 includes a cold heat exchanger 30 in thermal communication with the evaporator 22 and a cold coolant pump 32 that circulates a cold coolant through the cold heat exchanger 30. The cold coolant loop 14 may scavenge waste heat from various vehicle heat sources, such as the electric drive motor, power electronics, and an internal combustion engine of a hybrid vehicle, thereby cooling the various heat sources. The refrigerant loop 12 transfers, or pumps, the heat from the cold coolant loop 14 to the hot coolant loop 16, which in turn transfer the heat to various components throughout the vehicle for beneficial use, such as a comfort heat exchanger to provide supplemental heat to the passenger compartment.

Figure 2:
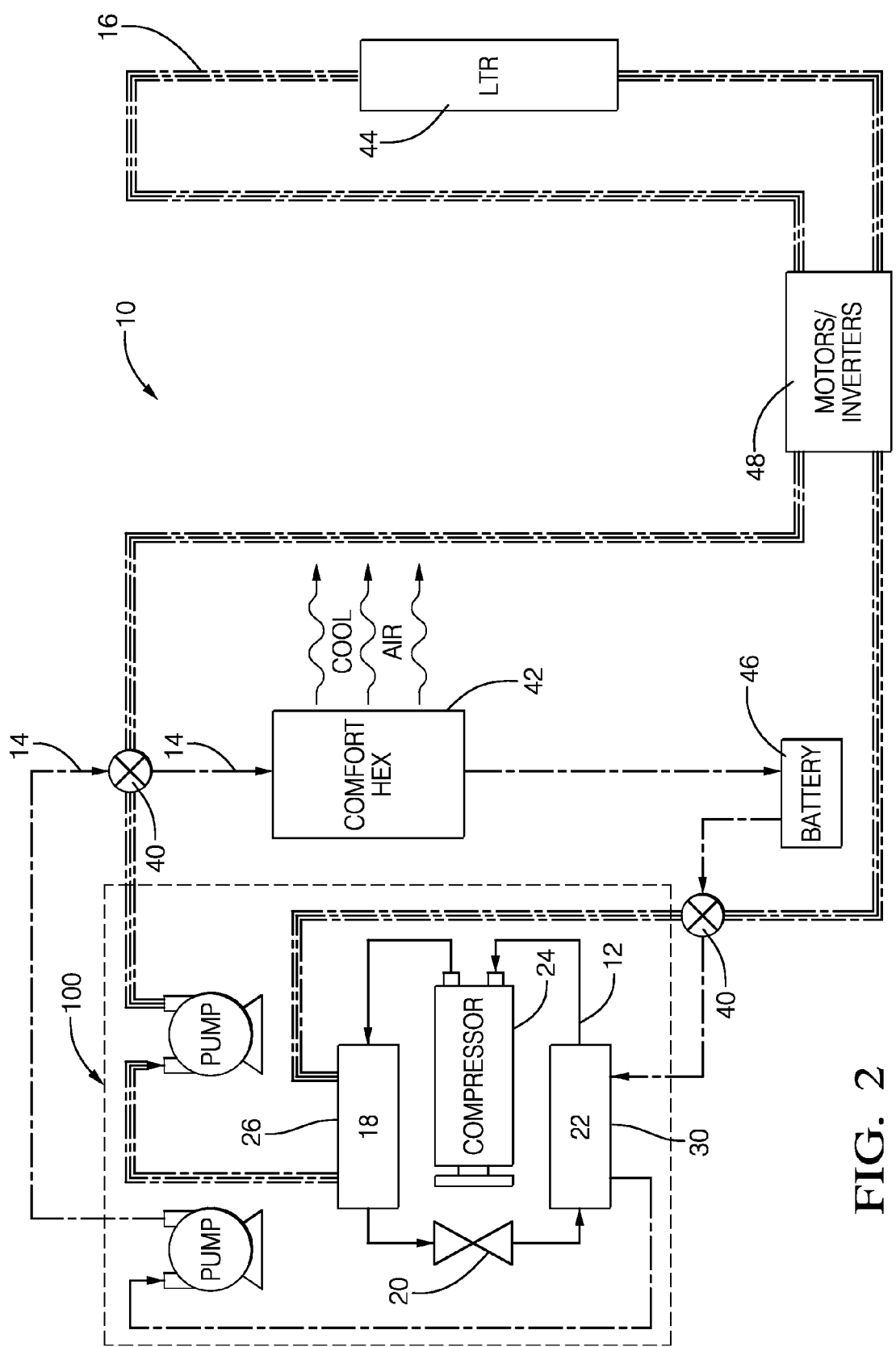
FIG. 2 shows a schematic diagram of a Unitary HPAC system for a motor vehicle operating in cooling mode.
Figure 3:
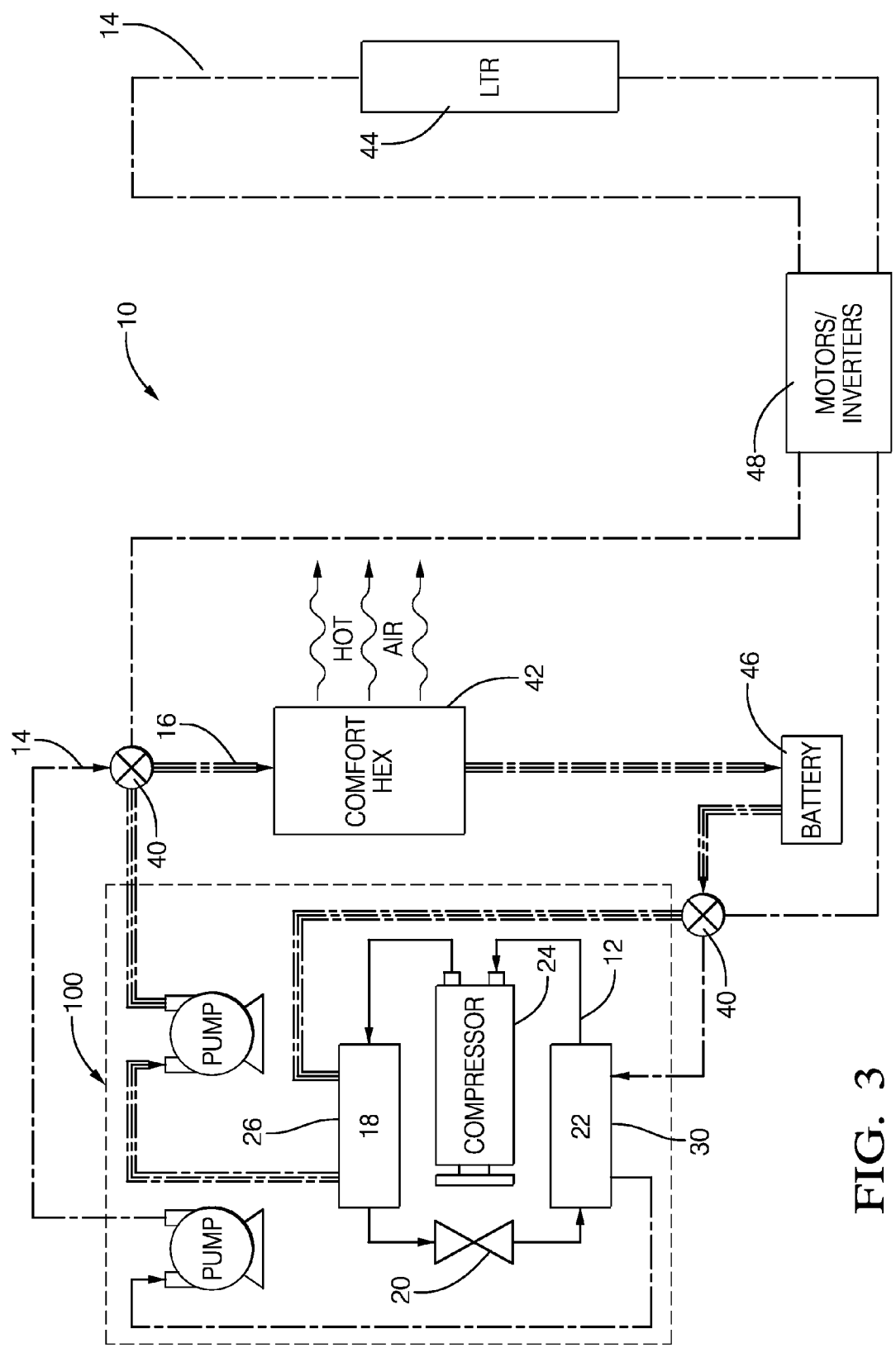
FIG. 3 shows a schematic diagram of a Unitary HPAC system for a motor vehicle operating in heating mode.

Referring to FIGS. 2 and 3, the flow paths of the cold and hot coolant loops 14, 16 throughout the vehicle may be reconfigured based on the cooling and heating needs of the vehicle. The cold and hot coolant loops 14, 16 may include a myriad of interconnecting branches with remotely activated valves 40 at strategic nodes that may be reconfigured to redefine the flow paths of the respective coolant loops 14, 16 to selectively provide cold or hot coolant flow to designated heat exchangers. The refrigerant loop 12 transfers the heat energy from the cold coolant loop 14 to the hot coolant loop 16.

For example, in cooling mode, referring to FIG. 2, the cold coolant loop 14, shown in single dashed lines, is configured to allow cold coolant flow through a comfort heat exchanger 42 to cool the air to the occupant compartment and, if desired, to a battery heat exchanger 46 to cool the batteries, while the hot coolant loop 16, shown in triple dashed lines, is configured to allow hot coolant flow through an external heat exchanger 44, such as a low temperature radiator 44, to dissipate the heat. In heat pump mode, referring to FIG. 3, the cold coolant loop, shown in single dashed lines, may be directed to internal ancillary heat exchangers 48 to scavenge vehicle internal heat and the external heat exchanger 44 to scavenge heat from the ambient air. The hot coolant loop 16, shown in triple dashed lines, may be redirected through the comfort heat exchanger 42 to heat the air to the occupant compartment and, if desired, to the battery heat exchanger 46 to maintain the batteries at an optimal operating temperature.

The refrigerant flowing through the refrigerant loop 12 does not need to be reversed; it is the reconfiguring of the cold and hot coolant loops 14, 16 that determines whether the system is working in cooling or heat pump modes. In other words, unlike the known methods of operating an air-conditioning system in heat pump mode, the refrigerant loop 12 of the current invention is never reversed. A benefit of this is there is no need to reinforce the refrigerant tubing and fittings throughout the refrigerant loop 12 since the low pressure side of the refrigerant loop 12 is not subject to high pressure refrigerant.

As with most, if not all, heat pump systems, there are conditions when ice will form on the core, or frosting, of the external heat exchanger 44. The risk of frosting exists whenever the temperature of the cold coolant flowing through the external heat exchanger 44 is at or below the freezing point of water and there is condensate present on the exterior surfaces of the external heat exchanger 44. One method of removing ice, or defrosting, from the core of the external heat exchanger 44 is to reroute a portion or all of the hot coolant loop 16 directly to the external heat exchanger 44. However, there are some drawbacks to rerouting the hot coolant loop 16 for this purpose. One is the rapid drop in hot coolant temperature as it flows through the external heat exchanger 44. The defrosting takes about 30 seconds and when the hot coolant is sent to the low temperature heat exchanger 44, which is typically located in the front end of the motor vehicle, the hot coolant cools down rapidly because of the high airflow in the front, resulting in loss of heat supplied to the comfort heat exchanger 42. This decreases the heating capacity of the Unitary HPAC System 10, which will reduce the temperature of the conditioned air provided to the passenger compartment, thereby causing discomfort to the passengers.

Figure 4:
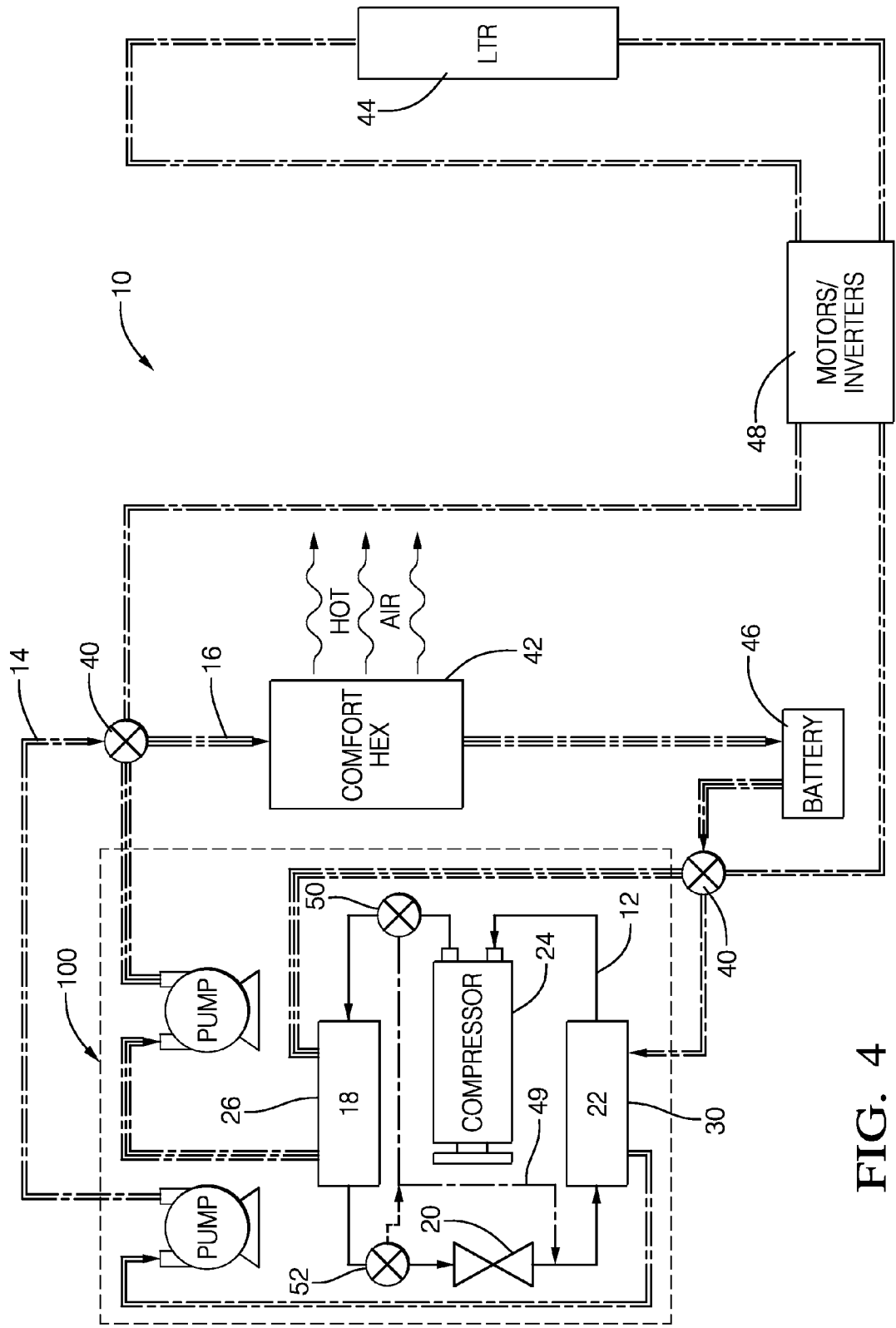
FIG. 4 shows a schematic diagram of a Unitary HPAC system for a motor vehicle operating in heating mode, in which the Unitary HPAC includes a compressed vapor dispersion loop.

The present invention provides a unique system and method for defrosting the low temperature heat exchanger 44 by providing a compressed vapor diversion loop 49 in the Unitary HPAC System 10, or more specifically, in the Unitary HPAC 100. The components of the Unitary HPAC 100 is described in detail below and illustrative examples shown in FIGS. 5 and 6. Referring to FIG. 4, in heat pump and defrost mode, all of the hot compressed refrigerant exiting the compressor may be diverted to the evaporator 22, which is in thermal contact with the cold heat exchanger 30, to quickly warm the cold coolant loop 14 to defrost the low temperature radiator 44. While the low temperature radiator 44 is being defrosted, the thermal inertia of the hot coolant flowing in the hot coolant loop 16 continues to provide heat to the comfort heat exchanger 42. When the diversion of the hot compressed refrigerant is ceased and the system reverts back to the normal heat pump mode, as shown in FIG. 3, the heat in the cold coolant loop 14 is pumped back into the hot coolant loop 16 to continue supplying heat to the passenger compartment via the comfort heat exchanger 42; thus there is no waste of energy in this process. Alternatively, a portion, as opposed to all, of the hot compressed refrigerant exiting the compressor may be diverted to the evaporator 22, thereby providing only the heat necessary to quickly increase the temperature of the cold coolant flowing in the cold coolant loop 14 for defrosting the external heat exchanger 44 without noticeably affecting the heat supplied to the passenger compartment. By diverting all or only a portion of the hot compressed refrigerant to heat the cold coolant loop 14 and not diverting the hot coolant loop 16 avoids materially affecting passenger comfort, since the compressed vapor diversion loop is independent of the hot coolant flow through the comfort heater exchanger 42.

A compressed vapor diversion loop 49 may be provided between the discharge of the compressor 24 and the inlet of the evaporator 22 downstream of the expansion device 20. As described above, the evaporator 22 is in thermal communication with the cold heat exchanger 30, through which the cold coolant flows scavenging heat from the external heat exchanger 44. A proportioning valve 50 may be provided to selectively divert all or a portion of the hot compressed refrigerant from the compressor 24 directly to the evaporator 22 instead of the condenser 18, which is in thermal contact with the hot heat exchanger 26, through which a hot coolant flows. A bypass valve 52 may be provided upstream of the expansion device 20 for by-passing the expansion device 20 when the hot compressed refrigerant is being partially diverted to the evaporator 22. The bypass valve 52 will prevent the hot compressed refrigerant from being partially expanded to ensure maximum transfer of heat to the cold coolant loop 14. The proportioning valve 50 cooperating with the by-pass valve 52 will enable maximum heat from the hot compressed refrigerant exiting the compressor 24 to be proportioned to both the hot coolant loop 16 to allow for continued heat for the passenger compartment and the cold coolant loop 14 to allow for the defrosting of the external heat exchanger 44.

The diverted hot compressed refrigerant flowing through the evaporator 22 provides sufficient heat to the cold coolant loop 14 to defrost any ice formed on the external heat exchanger 44. This allows the hot coolant loop 16, to continue to be used for cabin heating. Since the defrost cycle requires approximately less than a minute or two, the thermal inertia of the hot coolant will be able to continue to provide heating to the passenger compartment during the defrost cycle. When the compressed vapor diversion cycle ends, the cold coolant loop 14 is still warm and allows this heat to be pumped back up into the hot coolant loop 16 of the circuit, thereby not losing all the heat that was used for defrosting the exterior heat exchanger 44. This will aid in getting the Coefficient of Performance (COP) as high as possible as well as getting the hot coolant to the desired temperature relatively quickly.

Figure 5:
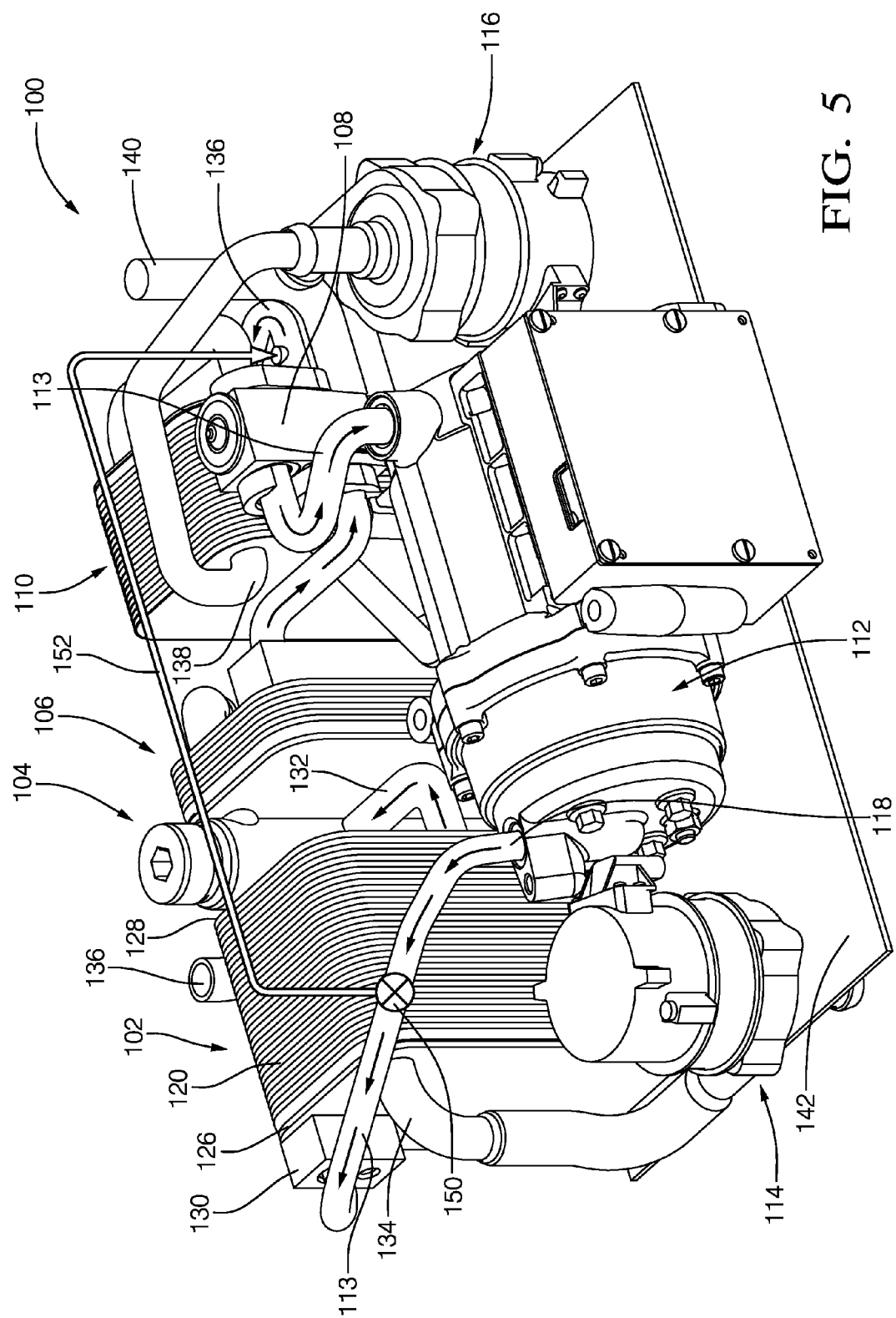
FIG. 5 shows an embodiment of a Unitary HPAC having a compressed vapor dispersion loop.

Shown in FIG. 5 is an exemplary embodiment of a compact Unitary HPAC 100 having an integral condenser hot heat exchanger assembly 102, a receiver 104, a sub-cooler 106, a thermal expansion valve (TXV) 108, and an integral evaporator/cold heat exchanger assembly 110. The Unitary HPAC 100 also includes an electrically driven compressor 112 for the circulation of a typical two-phase refrigerant through a series of refrigerant tubes 113 and electrically driven hot and cold coolant pumps 114, 116 configured to hydraulically connect to the hot coolant loop and cold coolant loop, respectively. The compressor may be that of a compact scroll compressor driven by a permanent magnet motor with neodymium or other rare earth magnets. The liquid coolant used in the hot and cold coolant loops is generally a mixture of 70% glycol-30% water, which prevents the coolant from freezing or becoming too viscous at the low temperatures needed in integral evaporator/cold heat exchanger assembly 110.

The integral condenser/hot heat exchanger assembly 102 may be that of a plate-type heat exchanger assembly having a plurality of stamped metal plates 120 stacked and brazed between an upstream end plate 126 and a downstream end plate 128. The stamped metal plates include features known to those of ordinary skill in the art, such as openings, bosses about selected openings, and flanges, which when stacked, define a condenser refrigerant passageway for high pressure refrigerant flow and a separate hot coolant passageway for hot coolant flow. The plates may include numerous contact points established between adjacent plates to induce turbulence to the fluids flowing through to provide a high heat transfer coefficient.

The flows of the hot refrigerant and hot coolant through the integral condenser/hot heat exchanger assembly 102 are in non-contact thermal communication; in other words, the two fluids are not intermingle, but are in thermal communication with each other, and may be concurrent or countercurrent flow. Heat energy from the higher temperature refrigerant is transferred to the lower temperature hot coolant; thereby increasing the temperature of the hot coolant as it leaves the integral condenser/hot heat exchanger assembly 102 and returning to the hot coolant loop (not-shown). The upstream end plate 126 includes a refrigerant inlet 130 in fluid communication with the discharge side 118 of the electrically driven compressor 112 and a hot coolant inlet 134 in fluid communication with the hot coolant pump 114. The downstream end plate 128 includes a refrigerant outlet 132 in fluid communication with the receiver 104 and a hot coolant outlet 136 configured to hydraulically connect to the hot coolant loop.

Similarly, the downstream sub-cooler 106 and integral evaporator/cold heat exchanger assembly 110 may also be plate-type heat exchangers. The integral evaporator/cold heat exchanger assembly 110 includes a cold coolant inlet 138 and outlet 140, in which the cold coolant outlet 140 is adapted to hydraulically connect to the cold coolant loop (not shown), an evaporator refrigerant passageway for low pressure refrigerant flow, and a separate cold coolant passageway for cold coolant flow. The flows of the low pressure refrigerant and cold coolant through the integral evaporator/cold heat exchanger assembly 110 are also in non-contact thermal communication with each other, and may be concurrent or countercurrent flow. Heat energy from the higher temperature cold coolant is transferred to the lower temperature evaporating refrigerant, thereby decreasing the temperature of the cold coolant as it leaves the integral evaporator/cold heat exchanger assembly 110 and returning to the cold coolant loop (not-shown).

Figure 6:
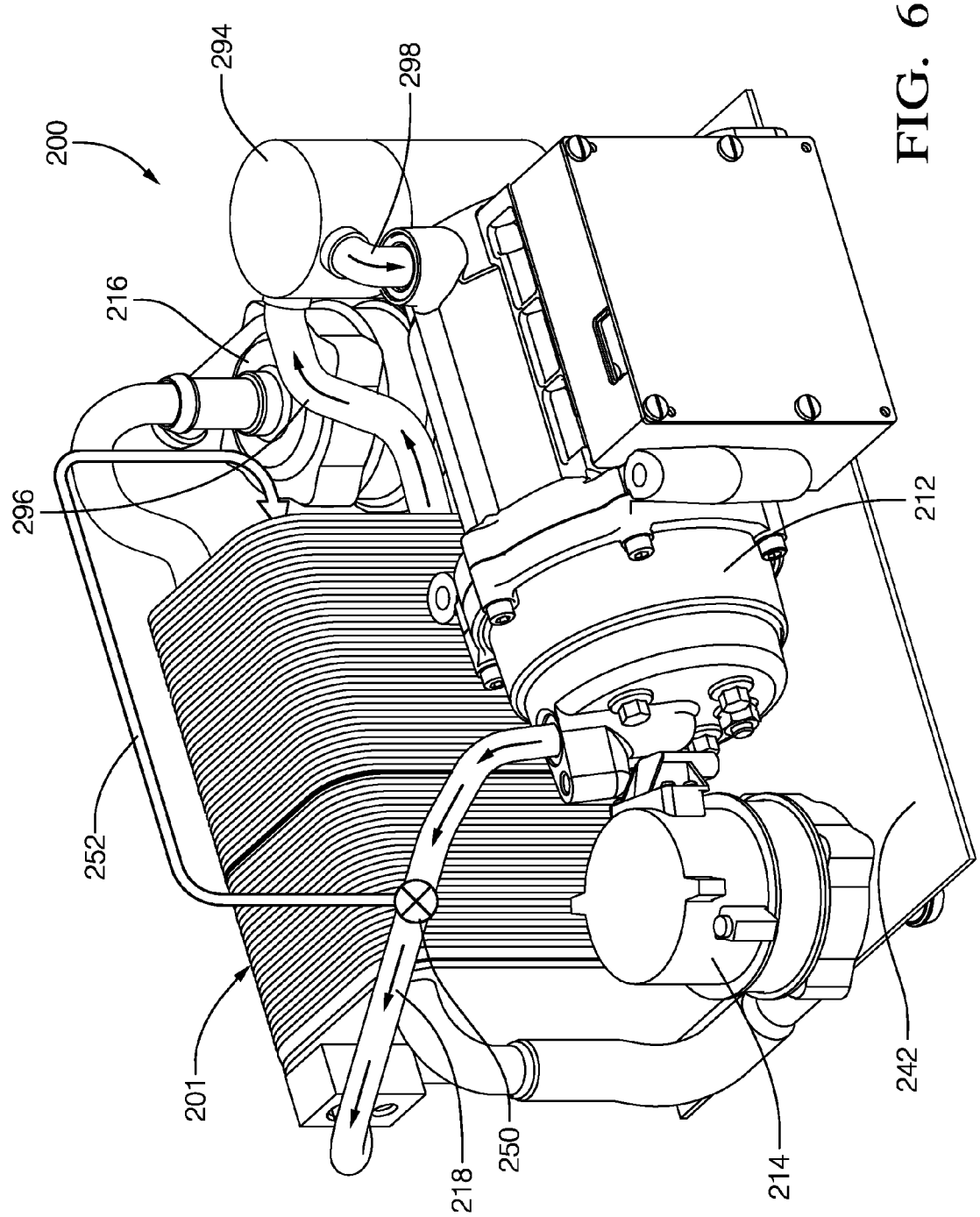
FIG. 6 shows an embodiment of a Unitary HPAC having a compressed vapor dispersion loop.

Shown in FIG. 6 is an alternative embodiment of the Unitary HPAC 100, in which the integral condenser/hot heat exchanger assembly 102, the receiver 104, the sub-cooler 106, the thermal expansion valve (TXV) 108, and the integral evaporator/cold heat exchanger assembly of the Unitary HPAC 100 shown in FIG. 5 is replaced by a single compact plate-type HPAC heat exchanger 201 assembled from a plurality of stacked and brazed metallic plates. An accumulator 294 may be provided downstream, with respect to the flow of refrigerant, of the plate-type HPAC heat exchanger 201 and upstream of the compressor 212. The plate-type HPAC heat exchanger 201 includes essentially three joined heat exchanger portions working in conjunction as one integral unit, in which a refrigerant is used to transfer heat energy from a cold coolant loop to a hot coolant loop, thereby cooling the cold coolant loop and heating the hot coolant loop.

For the first embodiment shown in FIG. 5, a proportioning diverter valve 150 is added to the compressor 112 discharge line to control the duration of the compressed vapor diversion. A refrigerant line 152 is added from the proportion diverter valve 150 to the integral evaporator/cold heat exchanger assembly 110 inlet downstream of the TXV 108. For the alternative embodiment shown in FIG. 6, a proportioning diverter valve 250 is added in the compressor discharge line downstream of the compressor 212. A refrigerant line 252 is then connected to the inlet side of the plate-type HPAC heat exchanger 201. The hot compressed refrigerant is brought into the plate-type HPAC heat exchanger 201.

Figure 7:
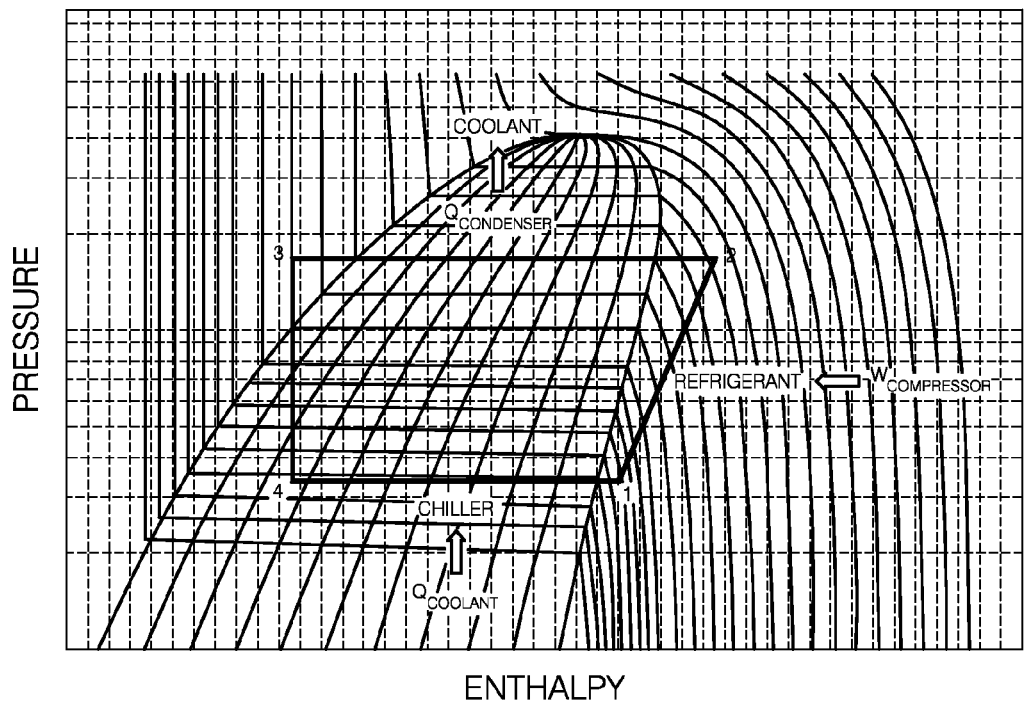
FIG. 7 shows a refrigerant cycle graph for a Unitary HPAC system operating without compressed vapor dispersion.

FIG. 7 shows the refrigeration cycle of the current system on a pressure-enthalpy diagram. The work put into the system by the compressor is shown by line 1-2. As the refrigerant flows through the condenser, line 2-3, heat from the refrigerant is rejected and transferred to the coolant. During this process the refrigerant changes phase from vapor to liquid. After leaving the condenser, the refrigerant flows through the expansion device, line 3-4. This process drops the temperature and pressure of the refrigerant and causes some of the liquid to flash back to vapor. As the liquid-vapor refrigerant mixture flows through the cold heat exchanger, it absorbs heat from the coolant. This heat causes the refrigerant to boil, changing back to vapor before returning to the compressor, point 1.

Figure 8:
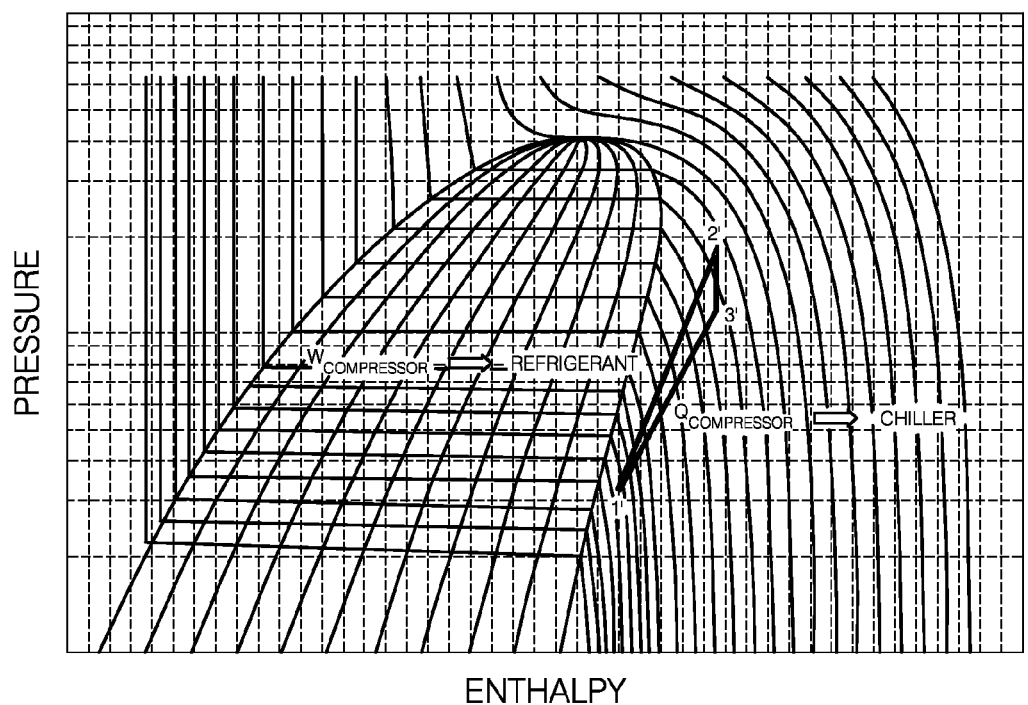
FIG. 8 shows a refrigerant cycle for a Unitary HPAC system operating with compressed vapor dispersion.

The cycle for the compressed vapor diversion is shown in FIG. 8. The work put into the system by the compressor is shown by line 1'-2'. In this case, the hot compressed refrigerant from the compressor is not directed to the condenser. Instead, the diverter valve directs it to the evaporator, line 2'-3'. The refrigerant flows through the evaporator, transfers the heat from the compressor to the coolant flowing through the cold heat exchanger, and then returns to the compressor, shown by line 3'-1'. The coolant that was heated by the cold heat exchanger is sent to the low temperature radiator defrosting.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the intentions without departing from the essential scope thereof. Therefore, it is intended that the invention not be limited to the particular embodiment disclosed as the best mode contemplated for carrying out this invention, but that the invention will include all embodiments falling within the scope of the appended claims.

Having described the invention, it is claimed:

1. A unitary heat pump air conditioner (HPAC) system, comprising:
   a refrigerant loop including:
   a condenser configured to condense a hot compressed refrigerant into a liquid refrigerant,
   an expansion device configured to receive and partially expand the liquid refrigerant from the condenser into a vapor-liquid phase refrigerant,
   an evaporator downstream of the expansion device configured to evaporate the vapor-liquid phase refrigerant into a cold vapor refrigerant and is in thermal communication with a cold coolant loop having an external heat exchanger, and
   a compressor configured to receive and compress the cold vapor refrigerant from the evaporator into the hot compressed refrigerant and to deliver the hot compressed refrigerant to the condenser via a compressor discharge line extending from an exit of the compressor to an inlet of the condenser,
   wherein the refrigerant loop includes means to selectively divert a portion amounting to less than 100% and more than 0% of the hot compressed refrigerant exiting from the compressor to the evaporator in a hot compressed state via a proportioning valve in a location along the compressor discharge line, wherein the refrigerant delivered from the compressor to the condenser passes through the proportioning valve.

2. The unitary HPAC system of claim 1, wherein the proportioning valve is also operative to selectively divert from zero up to and including 100 percent of the hot compressed refrigerant exiting from the compressor to the evaporator by shutting off the discharge line.

3. The unitary HPAC system of claim 2, wherein the means to selectively divert the portion of the hot compressed refrigerant includes a refrigerant diversion loop hydraulically connecting the proportioning valve to an inlet of the evaporator.

4. The unitary HPAC system of claim 3, wherein the refrigerant loop includes a bypass valve positioned downstream of the condenser and upstream of the expansion device, the bypass valve operative to bypass the liquid refrigerant exiting the condenser to the diversion loop when the proportioning valve is diverting less than 100 percent of hot compressed refrigerant from the compressor.

5. The unitary HPAC system of claim 2, wherein:
   the external heat exchanger is susceptible to frosting, and
   the proportioning valve is operative to divert the portion of the hot compressed refrigerant to the evaporator to sufficiently provide heat to the cold coolant loop to defrost the external heat exchanger.

6. The unitary HPAC system of claim 1, wherein the refrigerant loop includes a bypass valve positioned downstream of the condenser and upstream of the expansion device.

7. The unitary HPAC system of claim 6, wherein the bypass valve is operative to divert the liquid refrigerant exiting the condenser directly to the evaporator.

8. The unitary HPAC system of claim 1, wherein:
   the external heat exchanger is susceptible to frosting, and
   the means to selectively divert the portion of the hot compressed refrigerant exiting from the compressor directly to the evaporator is operative to provide sufficient heat energy to the cold coolant loop to defrost the external heat exchanger.

9. The unitary HPAC system of claim 1, wherein the means to selectively divert the portion of the hot compressed refrigerant includes:
   the proportioning valve,
   a refrigerant diversion loop hydraulically connecting the proportioning valve to an inlet of the evaporator; and
   a bypass valve operative to bypass the liquid refrigerant exiting the condenser to the refrigerant diversion loop when the proportioning valve is diverting less than 100 percent of hot compressed refrigerant from the compressor.

10. A method for defrosting an external heat exchanger of a unitary heat pump air conditioner (HPAC) system, comprising the steps of:
providing a refrigerant loop having:
a condenser configured to condense a hot compressed refrigerant into a liquid refrigerant,
an expansion device configured to receive and partially expand the liquid refrigerant from the condenser into a vapor-liquid phase refrigerant,
an evaporator downstream of the expansion device configured to evaporate the vapor-liquid phase refrigerant into a cold vapor refrigerant,
a compressor configured to receive and compress the cold vapor refrigerant from the evaporator into the hot compressed refrigerant for the condenser and to supply the hot compressed refrigerant to the condenser via a compressor discharge line extending from an exit of the compressor to an inlet of the condenser;
providing a cold coolant loop in thermal communication with the evaporator and the external heat exchanger;
diverting a portion amounting to less than 100% and more than 0% of the hot compressed refrigerant exiting from the compressor directly to the evaporator in a hot compressed state via a proportioning valve in a location along the compressor discharge line to transfer sufficient heat from the hot compressed refrigerant to the cold coolant loop to defrost the external heat exchanger; wherein the refrigerant delivered from the compressor to the condenser passes through the proportioning valve.

11. The method of claim 10, further comprising the steps of:
providing a refrigerant diversion loop hydraulically connecting the exit of the compressor to an inlet of the evaporator;
wherein the proportioning valve is configured to selectively divert the portion of the hot compressed refrigerant exiting from the compressor to the inlet of the evaporator;
detecting frosting of the external heat exchanger; and
diverting a sufficient portion of the hot compressed refrigerant to the evaporator to provide sufficient heat to defrost the external heat exchanger.

12. A unitary heat pump air conditioner (Unitary HPAC), comprising:
a refrigerant loop having a condenser for condensing a high pressure vapor,
an evaporator downstream of the condenser for evaporating a low pressure liquid refrigerant, and
a compressor for receiving a low pressure vapor refrigerant from the evaporator and discharging a high pressure vapor refrigerant to the condenser via a compressor discharge line extending from an exit of the compressor to an inlet of the condenser;
a cold side heat exchanger configured to hydraulically connect to a cold side coolant loop, wherein the cold side heat exchanger is in thermal communication with the evaporator;
a hot heat exchanger configured to hydraulically connect to a hot side coolant loop, wherein the hot heat exchanger is in thermal communication with the condenser; and
a refrigerant diversion loop hydraulically connecting the hot compressed refrigerant exiting from the compressor to the evaporator via a proportioning valve in a location along the compressor discharge line, the proportioning valve configured to divert a portion of the hot compressed refrigerant to the evaporator in a hot compressed state, wherein the refrigerant delivered from the compressor to the condenser passes through the proportioning valve; and
a bypass valve positioned downstream of the condenser and upstream of an expansion device, the bypass valve operative to divert the liquid refrigerant exiting the condenser directly to the evaporator.

13. The unitary heat pump air conditioner (Unitary HPAC) of claim 12, wherein the proportioning valve is configured to selectively divert the portion of the hot compressed refrigerant exiting from the compressor to the evaporator.

14. The unitary heat pump air conditioner (Unitary HPAC) of claim 12, wherein the bypass valve is operative to bypass the liquid refrigerant exiting the condenser to the diversion loop when the proportioning valve is diverting less than 100 percent of hot compressed refrigerant from the compressor to the condenser.

* * * * *